United States Patent
Park

(10) Patent No.: US 12,327,898 B2
(45) Date of Patent: Jun. 10, 2025

(54) APPARATUS AND METHOD FOR MANUFACTURING MEMBRANE-ELECTRODE ASSEMBLY

(71) Applicants: Hyundai Motor Company, Seoul (KR); Kia Corporation, Seoul (KR)

(72) Inventor: Ju Ahn Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 107 days.

(21) Appl. No.: 17/543,162

(22) Filed: Dec. 6, 2021

(65) Prior Publication Data

US 2022/0181664 A1  Jun. 9, 2022

(30) Foreign Application Priority Data

Dec. 8, 2020 (KR) .......... 10-2020-0170219

(51) Int. Cl.
*H01M 8/1004* (2016.01)
*H01M 8/1069* (2016.01)

(52) U.S. Cl.
CPC ....... *H01M 8/1004* (2013.01); *H01M 8/1069* (2013.01)

(58) Field of Classification Search
CPC .......... H01M 8/1004; H01M 8/1069
See application file for complete search history.

(56) References Cited

U.S. PATENT DOCUMENTS

| | | | |
|---|---|---|---|
| 6,197,147 B1 * | 3/2001 | Bonsel et al. ........ | H01M 4/926 156/269 |
| 2008/0063917 A1 * | 3/2008 | Yamashita et al. . | H01M 8/1025 429/483 |
| 2019/0044168 A1 * | 2/2019 | Nguyen et al. ..... | H01M 8/0258 |

* cited by examiner

*Primary Examiner* — Matthew T Martin
*Assistant Examiner* — Alexandra J Simmons
(74) *Attorney, Agent, or Firm* — Fox Rothschild LLP

(57) ABSTRACT

An apparatus and method for manufacturing a membrane-electrode assembly enable decal transfer to be effectively performed by lowering a glass transition temperatures of ion-conductive polymers included in an electrolyte membrane material and electrodes by spraying a sprayable material onto at least one of the electrolyte membrane material or each of the electrodes.

4 Claims, 1 Drawing Sheet

APPARATUS AND METHOD FOR MANUFACTURING MEMBRANE-ELECTRODE ASSEMBLY

CROSS-REFERENCE TO RELATED APPLICATION

This application claims under 35 U.S.C. § 119(a) the benefit of Korean Patent Application No. 10-2020-0170219 filed on Dec. 8, 2020, the entire contents of which are incorporated herein by reference.

BACKGROUND

(a) Technical Field

The present disclosure relates to an apparatus and method for manufacturing a membrane-electrode assembly, more particularly, it relates to the apparatus and method for manufacturing the membrane-electrode assembly in which decal transfer may be effectively performed by lowering a glass transition temperatures of ion-conductive polymers included in an electrolyte membrane material and electrodes by spraying a sprayable material onto at least one of the electrolyte membrane material or each of the electrodes.

(b) Background Art

In a fuel cell system, a membrane-electrode assembly, which is the smallest energy-generating unit, includes an electrolyte and electrodes. Decalcomania typically is used as a method for adhering an electrode, which has carbon or an oxide as a support and includes a catalyst having high activity and an ionomer, to an electrolyte membrane formed of a polymer having high ion conductivity. Decalcomania is based on the principle of adsorption, which describes adhesion between two polymers, and in particular, the two polymers may be ionomers in the electrolyte membrane and the electrode.

When adhesion commences, an interface between the polymers, which are thermodynamically compatible or partially compatible, disappears or exhibits a uniform phase due to interdiffusion of polymer chains at the interface between the polymers.

In the case of adhesion between polymer specimens, due to this phenomenon, polymer chains mutually diffuse from one side of the interface between the polymer specimens to the other side of the interface, and thus become entangled with the counterpart polymer chains, thereby generating adhesive force.

In a membrane-electrode assembly for fuel cells, in order to enable an electrode to be transferred onto an electrolyte membrane, polymers included in the electrode and the electrolyte membrane must have similar molecular structures so as to be compatible, and a temperature sufficient to realize a glass transition state and sufficient pressure and time for the electrode to adhere to the electrolyte membrane in the glass transition state are required.

The transfer temperature and the transfer pressure are complementary to each other, and may be appropriately adjusted depending on the transfer process conditions. Various transfer process methods are well known, and these methods are executed at various temperatures and pressures using various transfer systems depending on the kinds of the electrolyte membranes and the electrodes.

However, in the case of an electrolyte membrane having an excessively high glass transition temperature, it is not possible to satisfactorily transfer an electrode to the electrolyte membrane merely by increasing the transfer pressure, and the high temperature required to realize the glass transition state may cause changes in the physical properties of the electrolyte membrane, an electrode release paper and the electrode, and deterioration of durability of transfer equipment, thus hindering the transfer process.

The above information disclosed in this Background section is only for enhancement of understanding of the background of the disclosure and therefore it may contain information that does not form the prior art that is already known in this country to a person of ordinary skill in the art.

SUMMARY

The present disclosure provides an apparatus and method which may improve a speed of processing for decal transferring electrodes onto an electrolyte membrane material.

It is another object of the present disclosure to provide an apparatus and method which may stably transfer electrodes to an electrolyte membrane material at a low temperature.

It is yet another object of the present disclosure to provide an apparatus and method which may improve adhesion of electrodes transferred onto an electrolyte membrane material.

In one aspect, the present disclosure provides an apparatus for manufacturing a membrane-electrode assembly, the apparatus including a first feed roller configured to supply an electrolyte membrane material, a second feed roller located over the electrolyte membrane material to supply an upper release paper coated with a first electrode, a third feed roller located under the electrolyte membrane material to supply a lower release paper coated with a second electrode, transfer rollers configured to transfer the first and second electrodes on the upper and lower release papers onto a surface of the electrolyte membrane material, a first recovery roller configured to recover the membrane-electrode assembly including the electrolyte membrane material having the first and second electrodes transferred onto the electrolyte membrane material, and spray devices or a humidification device configured to spray a sprayable material to at least one of the electrolyte membrane material or the first and second electrodes.

In a preferred embodiment, each of the spray devices may include a body configured to store the sprayable material, and a nozzle configured to discharge the sprayable material in the body outside.

In another preferred embodiment, the spray devices may be located between the first feed roller and the transfer rollers, and provide the sprayable material to at least one of the electrolyte membrane material supplied by the first feed roller, or the first electrode applied on the upper release paper and the second electrode applied on the lower release paper.

In still another preferred embodiment, the sprayable material may include, and the water may be provided in a form of water vapor to at least one of the electrolyte membrane material or the first and second electrodes.

In yet another preferred embodiment, the humidification device may include a shield room configured to protect an inner space of the shield room from outside so as to block movement of substances, and a thermo-hygrostat located inside the shield room and configured to spray water vapor so as to increase a relative humidity inside the shield room.

In still yet another preferred embodiment, the first feed roller, the second feed roller, the third feed roller, the transfer rollers and the first recovery roller may be located in the shield room of the humidification device.

In another aspect, the present disclosure provides a method for manufacturing a membrane-electrode assembly, the method including preparing an electrolyte membrane material and electrodes, each of which includes an ion conductive polymer, transferring the electrodes onto the electrolyte membrane material, and spraying a sprayable material to at least one of the electrolyte membrane material or the electrodes at least once during the preparing of the electrolyte membrane material and the electrodes, during the transferring of the electrodes onto the electrolyte membrane material, or between the preparing of the electrolyte membrane material and the electrodes and the transferring of the electrodes onto the electrolyte membrane material, wherein the sprayable material is directly sprayed by spray devices, or is indirectly sprayed by a humidification device.

In a preferred embodiment, in the transferring of the electrodes onto the electrolyte membrane material, the electrodes may be transferred onto a surface of the electrolyte membrane material by applying heat and pressure.

In another preferred embodiment, the heat of a temperature greater than or equal to a glass transition temperature of each of the ion conductive polymers may be applied.

In still another preferred embodiment, the sprayable material may include water, and the water may be provided in a form of water vapor to at least one of the electrolyte membrane material or the electrodes.

In yet another preferred embodiment, 33 to 66 parts by volume of the sprayable material may be sprayed per 100 parts by volume of the ion conductive polymer included in the electrolyte membrane material or each of the electrodes.

In still yet another preferred embodiment, the ion conductive polymer included in at least one of the electrolyte membrane material or each of the electrodes may be plasticized by the sprayable material in the spraying of the sprayable material, and the glass transition temperature of the ion conductive polymer may be lowered by the plasticization.

In a further preferred embodiment, in the spraying of the sprayable material, the sprayable material may be directly sprayed by the spray devices, and the sprayable material may be sprayed at a flow rate of 1 to 100 L/min·m$^2$ and a pressure of 1 to 5 bar.

In another further preferred embodiment, in the spraying of the sprayable material, the sprayable material may be indirectly sprayed by the humidification device, the humidification device may include a shield room configured to block movement of substances from outside, and the preparing of the electrolyte membrane material and the electrodes, the transferring of the electrodes onto the electrolyte membrane material, and the spraying of a sprayable material may be executed inside the shield room.

In still another further preferred embodiment, the relative humidity inside the shield room may be 50 to 100%.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
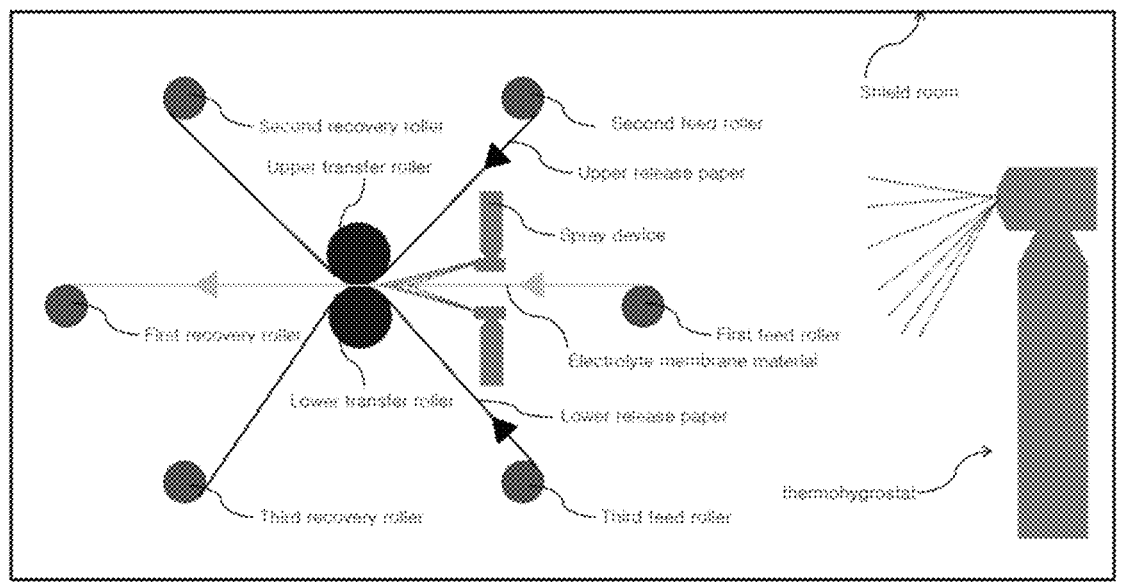
FIG. 1 is a schematic diagram illustrating an apparatus for manufacturing a membrane-electrode assembly according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above-described objects, other objects, advantages and features of the present disclosure will become apparent from the descriptions of embodiments given herein below with reference to the accompanying drawings. However, the present disclosure is not limited to the embodiments disclosed herein and may be implemented in various different forms. The embodiments are provided to make the description of the present disclosure thorough and to fully convey the scope of the present disclosure to those skilled in the art.

In the following description of the embodiments, the same elements are denoted by the same reference numerals even when they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the disclosure. Singular expressions may encompass plural expressions, unless they have clearly different contextual meanings.

In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are to be considered to be modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" includes not only values of 5, 6, 7, 8, 9 and 10 but also arbitrary subranges, such as a subrange of 6 to 10, a subrange of 7 to 10, a subrange of 6 to 9, and a subrange of 7 to 9, and arbitrary values between integers which are valid within the scope of the stated range, such as 5.5, 6.5, 7.5, 5.5 to 8.5, and 6.5 to 9. Further, for example, it will be understood that a range of "10% to 30%" includes not only all integers including values of 10%, 11%, 12%, 13%, . . . 30% but also arbitrary subranges, such as a subrange of 10% to 15%, a subrange of 12% to 18%, and a subrange of 20% to 30%, and arbitrary values between integers which are valid within the scope of the stated range, such as 10.5%, 15.5%, and 25.5%.

The present disclosure relates to an apparatus and method for manufacturing a membrane-electrode assembly, and more particularly, relates to an apparatus and method for manufacturing a membrane-electrode assembly in which decal transfer may be effectively performed by lowering the glass transition temperatures of ion-conductive polymers included in an electrolyte membrane material and electrodes by spraying a sprayable material onto at least one of the electrolyte membrane material or each of the electrodes.

Figure 2:
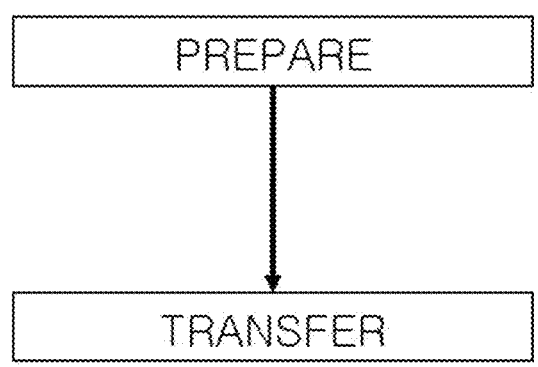
FIG. 2 is a flowchart showing a method for manufacturing a membrane-electrode assembly according to the present disclosure.

Hereinafter, an apparatus for manufacturing a membrane-electrode assembly according to the present disclosure will be described with reference to FIG. 1, and a method for manufacturing a membrane-electrode assembly according to the present disclosure will be described with reference to FIG. 2.

Apparatus for Manufacturing Membrane-Electrode Assembly

An apparatus for manufacturing a membrane-electrode assembly according to the present disclosure includes a first feed roller configured to supply an electrolyte membrane material, a second feed roller located over the electrolyte membrane material to supply an upper release paper coated with a first electrode, a third feed roller located under the electrolyte membrane material to supply a lower release paper coated with a second electrode, transfer rollers configured to transfer the first and second electrodes on the upper and lower release papers onto the surface of the electrolyte membrane material, and a first recovery roller configured to recover the membrane-electrode assembly including the electrolyte membrane material having the first and second electrodes transferred onto the electrolyte membrane material.

Particularly, the apparatus according to the present disclosure further includes spray devices configured to spray a sprayable material onto at least one of the electrolyte membrane material or the corresponding electrodes, or a humidification device.

Feed Rollers

The feed rollers according to the present disclosure includes the first feed roller configured to supply electrolyte membrane material, the second feed roller located over the electrolyte membrane material to supply the upper release paper coated with the first electrode, and the third feed roller located under the electrolyte membrane material to supply the lower release paper coated with the second electrode.

The upper release paper is supplied in the state in which the lower surface of the upper release paper facing the electrolyte membrane material is coated with the first electrode, and the lower release paper is supplied in the state in which the upper surface of the lower release paper facing the electrolyte membrane material is coated with the second electrode.

The first electrode on the upper release paper is transferred onto the upper surface of the electrolyte membrane material supplied by the first feed roller, and the second electrode on the lower release paper is transferred onto the lower surface of the electrolyte membrane material.

Transfer Rollers

The transfer rollers according to the present disclosure include a pair or transfer rollers configured to be engaged with each other so as to be rotated. In particular, the transfer rollers include an upper transfer roller located in an upper region and a lower transfer roller located in a lower region.

The upper transfer roller is located on the upper release paper supplied and fed by the second feed roller so as to be rotated, and the lower transfer roller is located under the lower release paper supplied and fed by the third feed roller so as to be engaged to be rotated.

The upper transfer roller applies heat and pressure to the upper release paper so as to adhere the first electrode on the upper release paper to the upper surface of the electrolyte membrane material, and the lower transfer roller applies heat and pressure to the lower release paper so as to adhere the second electrode on the lower release paper to the lower surface of the electrolyte membrane material.

Recovery Rollers

The recovery rollers according to the present disclosure includes the first recovery roller configured to recover the electrolyte membrane material including the electrodes transferred onto both surfaces of the electrolyte membrane material by the transfer rollers, a second recovery roller configured to recover the upper release paper remaining after transferring the first electrode thereon to the upper surface of the electrolyte membrane material, and a third recovery roller configured to recover the lower release paper remaining after transferring the second electrode thereon to the lower surface of the electrolyte membrane material.

The apparatus according to the present disclosure may further include the spray devices or the humidification device, as a device for providing water vapor to at least one of the electrodes or the electrolyte membrane.

Spray Devices

Each of the spray devices according to the present disclosure includes a body configured to store a sprayable material, and a nozzle configured to discharge the sprayable material in the body to the outside.

The sprayable material may include water, and the water may be sprayed in the form of water vapor. Further, as needed, the sprayable material may further include one inert gas selected from the group consisting of nitrogen, argon or a combination thereof.

The spray devices are located between the first feed roller and the transfer rollers, and each of the spray devices provides the sprayable material to at least one of the electrolyte membrane material supplied by the first feed roller or a corresponding one of the first electrode on the upper release paper and the second electrode on the lower release paper.

Humidification Device

The humidification device according to the present disclosure includes a shield room configured to protect the inner space of the shield room from the outside so as to block movement of substances, and a thermo-hygrostat located in the shield room and configured to spray water vapor so as to increase the relative humidity inside the shield room. That is, the shield room has a sealed structure so as to block the movement of a liquid or a gas between the inside and the outside of the shield room.

The feed rollers, the transfer rollers and the recovery rollers are located in the shield room of the humidification device.

Method for Manufacturing Membrane-Electrode Assembly

A method for manufacturing a membrane-electrode assembly according to the present disclosure includes preparing an electrolyte membrane material and electrodes, each of which includes an ion conductive polymer, and transferring the electrodes onto the electrolyte membrane material.

Particularly, the method according to the present disclosure may further include spraying a sprayable material to at least one of the electrolyte membrane material or each of the electrodes at least once during the preparation of the electrolyte membrane material and the electrodes, during the transfer of the electrodes onto the electrolyte membrane material, or between the preparation of the electrolyte membrane material and the electrodes and the transfer of the electrodes onto the electrolyte membrane material.

Preparation

The electrolyte membrane material and the electrodes, each of which includes the ion conductive polymer, are prepared.

Each of the electrodes may include a metal catalyst, a carbon support on which the metal catalyst is supported, and the ion conductive polymer.

Transfer

The electrodes on the upper and lower release papers are transferred onto the surface of the electrolyte membrane material by applying heat and pressure to the upper and lower release papers. Here, heat of a temperature greater than or equal to the glass transition temperature of each of the ion conductive polymers is applied so as to transfer the corresponding electrodes to the electrolyte membrane material. In particular, ion conductive polymer chains included in the electrolyte membrane and ion conductive polymer chains included in each of the electrodes are entangled with each other by receiving external heat and pressure, and thereby, the electrodes and the electrolyte membrane are adhered to each other. Here, the ion conductive polymer chains must not be severely twisted before they are entangled with each other. That is, spaces in which each of the ion conductive polymer chains may smoothly invade the counterpart ion conductive polymer chains so as to become entangled therewith must be formed at the interface between each of the electrodes and the electrolyte membrane, and such a diffusion process may be executed by applying heat of a temperature greater than or equal to the glass transition temperature of each of the ion conductive polymers thereto.

Spray

The ion conductive polymer included in at least one of the electrolyte membrane material or each of the electrodes is plasticized by spraying the sprayable material thereto, and the glass transition temperature of the ion conductive polymer is lowered by plasticization. The sprayable material may include water, and the water may be sprayed in the form of water vapor.

That is, the sprayed water vapor plasticizes the surfaces of the ion conductive polymers included in the electrodes and the electrolyte membrane and thus increases the distance between the ion conductive polymer chains, thereby lowering the glass transition temperatures of the ion conductive polymers and providing flexibility thereto.

In particular, 33 to 66 parts by volume of the sprayable material may be sprayed per 100 parts by volume of the ion conductive polymer included in the electrolyte membrane material or each of the electrodes. Here, when the amount of the sprayable material is less than 33 parts by volume, it may be difficult to sufficiently plasticize the ion conductive polymer, and when the amount of the sprayable material exceeds 66 parts by volume, efficiency of processing may be lowered due to the presence of an excessive amount of the spray material.

The sprayable material may be directly sprayed by the spray devices, or may be indirectly sprayed by the humidification device.

Direct spraying is performed by spraying the sprayable material at a flow rate of 1 to 100 L/min·m$^2$ and a pressure of 1 to 5 bar. The flow rate and the pressure of the sprayable material may be adjusted depending on the speed of processing, the size of the supplied electrolyte membrane material, and the width of the electrodes. However, when the flow rate of the sprayable material is less than 1 L/min·m$^2$, the processing time may be excessively prolonged, and thus efficiency may be lowered, and when the flow rate of the sprayable material exceeds 100 L/min·m$^2$, the surface of the electrolyte membrane material or the surfaces of the electrodes may be damaged, and processibility may be deteriorated due to the low purification degree of the surface of the electrolyte membrane material.

The spraying of the sprayable material may be performed during any operation, such as during the preparation of the electrolyte membrane material and the electrodes, during the transfer of the electrodes onto the electrolyte membrane material, or between the preparation of the electrolyte membrane material and the electrodes and the transfer of the electrodes onto the electrolyte membrane material, and when the sprayable material is indirectly sprayed by the humidification device, the spraying of the sprayable material may be performed throughout all operations of the method according to the present disclosure. In particular, the humidification device according to the present disclosure includes the shield room, configured to block the movement of substances from the outside, all operations, i.e., the preparation of the electrolyte membrane material and the electrodes, the transfer of the electrodes onto the electrolyte membrane material and the spraying of the sprayable material, may be performed inside the shield room of the humidification device. Here, the relative humidity inside the shield room may be 50 to 100%.

The overall efficiency of processing may be greatly increased by maintaining the shield room within the relative humidity range.

As is apparent from the above description, the present disclosure may provide an apparatus and method which may improve the speed of processing for decal transferring electrodes onto an electrolyte membrane material.

Further, the present disclosure may provide an apparatus and method which may stably transfer electrodes to an electrolyte membrane material at a low temperature.

Moreover, the present disclosure may provide an apparatus and method which may improve adhesion of electrodes transferred onto an electrolyte membrane material.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for manufacturing a membrane-electrode assembly, the method comprising:
preparing an electrolyte membrane material and electrodes, each of which comprises an ion conductive polymer;
transferring the electrodes onto the electrolyte membrane material; and
spraying a sprayable material to at least one of the electrolyte membrane material or the electrodes during the transferring of the electrodes onto the electrolyte membrane material,
wherein the sprayable material is directly sprayed by spray devices;
wherein the electrolyte membrane material is moved in one direction;
wherein transferring the electrodes onto the electrolyte membrane material comprises passing each of the electrodes between upper and lower transfer rollers provided above and below the electrolyte membrane material, respectively;
wherein, in transferring the electrodes onto the electrolyte membrane material, the electrodes are transferred onto a surface of the electrolyte membrane material by applying heat and pressure through the transfer rollers;
wherein the heat of a temperature greater than or equal to a glass transition temperature of each of the ion conductive polymers is applied;
wherein the sprayable material comprises water in the form of water vapor; and
wherein the sprayable material is sprayed at a flow rate of 1 to 100 L/min·m$^2$ and a pressure of 1 to 5 bar:
wherein 33 to 66 parts by volume of the sprayable material is sprayed per 100 parts by volume of the ion conductive polymer included in the electrolyte membrane material of each of the electrodes.

2. The method of claim 1, wherein:
the ion conductive polymer included in at least one of the electrolyte membrane material or each of the electrodes is plasticized by the sprayable material in the spraying of the sprayable material; and
a glass transition temperature of the ion conductive polymer is lowered by the plasticization.

3. The method of claim 1, wherein in spraying the sprayable material, the sprayable material is further indirectly sprayed by a humidification device, wherein:
the humidification device comprises a shield room configured to block movement of substances from outside; and
preparing the electrolyte membrane material and the electrodes, transferring the electrodes onto the electrolyte membrane material, and spraying the sprayable material are executed inside the shield room.

4. The method of claim 3, wherein a relative humidity inside the shield room is 50 to 100%.

* * * * *